United States Patent [19]

Kimura

[11] Patent Number: 4,685,780
[45] Date of Patent: Aug. 11, 1987

[54] REFLECTION TYPE OPTICAL DEVICE

[75] Inventor: Seiichirou Kimura, Koganei, Japan

[73] Assignee: Kabushiki Kaisha Toshiba, Kawasaki, Japan

[21] Appl. No.: 838,620

[22] Filed: Mar. 11, 1986

[51] Int. Cl.⁴ .................. G02B 17/06; G02B 5/10; B23K 27/00

[52] U.S. Cl. .................. 350/613; 350/620; 350/319; 350/163; 350/574; 219/121 LQ; 219/121 LP

[58] Field of Search ............... 350/613, 616, 617, 620, 350/627, 319, 322, 163, 574, 162.11, 448, 449; 219/121 LQ, 121 LP, 121 LR

[56] References Cited

U.S. PATENT DOCUMENTS

| 2,683,394 | 7/1954 | Polanyi et al. | |
| 4,315,130 | 2/1982 | Inagaki et al. | 219/121 LQ |
| 4,390,243 | 6/1983 | Hammerschlag | 350/319 |
| 4,422,893 | 12/1983 | Duchateau et al. | |
| 4,475,027 | 10/1984 | Pressley | 219/121 LQ |
| 4,518,232 | 5/1985 | Dagenais | 350/613 |

FOREIGN PATENT DOCUMENTS

| 0080597 | 6/1983 | European Pat. Off. | |
| 2023739 | 11/1970 | Fed. Rep. of Germany | 350/620 |
| 154484 | 9/1983 | Japan | 219/121 LQ |
| 60618 | 4/1985 | Japan | 350/613 |
| 2062282 | 10/1980 | United Kingdom | |

OTHER PUBLICATIONS

"Raiza Kakou Gijutsu—(Laser Machining Technique)", Japanese Welding Institute, Aug. 1982, p. 116.
Arrabito, et al, "Laser Perforation Technique", IBM Technical Disclosure Bulletin, vol. 13, No. 10, Mar. 1971, p. 3098.
Stanley L. Ream, "A Convex Mirror Integrator", *Laser Focus*, vol. 15, No. 11, Nov. 1979, pp. 68–71.

Primary Examiner—Jon W. Henry
Attorney, Agent, or Firm—Schwartz, Jeffery, Schwaab, Mack, Blumenthal & Evans

[57] ABSTRACT

A reflection type optical device comprises a convex integration mirror and a concave mirror. The convex integration mirror prepared by arranging side by side a plurality of plane segment mirrors, each preferably having a rectangular or square shape, on a material having convex outer surface so that a laser beam is divided and reflected by the integration mirror as reflected laser beams which are then condensed on a plurality of focal points lying on one plane, preferably at which a metal plate having a plurality of pin-holes substantially corresponding to the numbers of the focal points is located on the plane so that the focal points coincide with locations of the pin-holes, respectively.

8 Claims, 9 Drawing Figures

REFLECTION TYPE OPTICAL DEVICE

BACKGROUND OF THE INVENTION

This invention relates to a reflection type optical device utilizing an integration mirror or a segmented mirror for evenly distributing energy of a laser beam.

In this field of art, it is well known that an optical device of the type described above may comprise an optical integration mirror prepared by arranging a plurality of plane segment mirrors, each having a small rectangular surface area, one by one so as to provide a concave mirror surface as a whole. Also well known is an optical device that includes one plane mirror arranged in combination with the concave integration mirror mentioned above.

In the conventional optical device of the type described above, the respective plane segment mirrors are prepared and arranged so that the laser beams reflected by the respective segment mirrors are focused on corresponding respective points. Moreover, it is difficult to substantially eliminate an adverse diffraction effect caused on the boundary portions of the respective plane segment mirrors. Accordingly, when these conventional relfection type optical device are used, the energy of the laser beam is not evenly distributed as a heat source on a working point of a material to be worked, and for example, in an ordinal surface heat treatment, a quenching operation is not evenly carried out. In addition, since the area of the rectangular working point to be heated is limited in accordance with the size of each plane segment mirror, it is hard to change the size of the heat source for the material to be worked.

SUMMARY OF THE INVENTION

An object of this invention is to eliminate the defects of the prior art and to provide a reflection type optical device having a mirror arrangement capable of freely changing a surface area of a material to be thermally worked by laser beam.

Another object of this invention is to provide a reflection type optical device having a pin-hole plate located in combination with the mirror arrangement described above for obtaining an evenly distributed energy of the laser beam on the working spot.

These and other objects are achieved by the reflection type optical device of this invention which comprises a convex integration mirror prepared by forming side by side a plurality of plane segment mirrors, each preferably having a rectangular or square shape, on a convex surface of a material so that a laser beam generated from a laser oscillator is divided and reflected by the integration mirror as reflected laser beams and a concave mirror arranged so as to condense the reflected laser beams on a plurality of focal points lying on one plane, preferably at which a metal plate provided with a plurality of pin-holes substantially corresponding to the numbers of the focal points is located on the plane so that the focal points coincide with locations of the pin-holes, respectively.

DESCRIPTION OF THE PREFERRED EMBODIMENT

Figure 1:
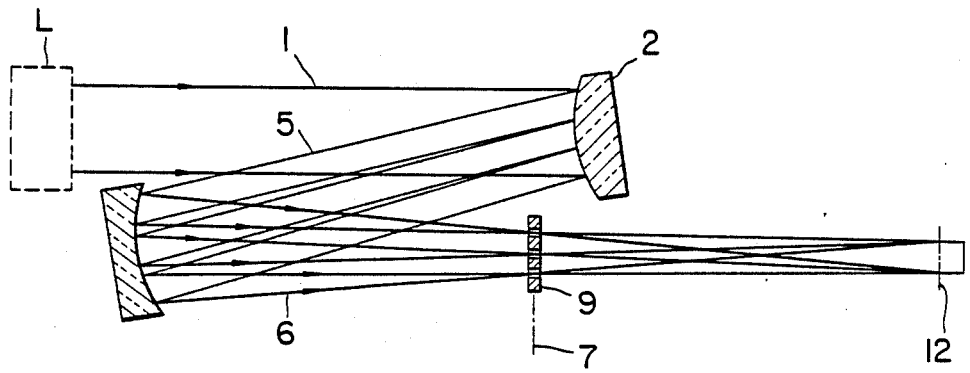
FIG. 1 shows a mirror arrangement of a reflection type optical device according to this invention.
Figure 2:
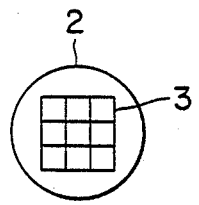
FIG. 2 is a plan view of an integration mirror used in the optical device shown in FIG. 1.
Figure 3:
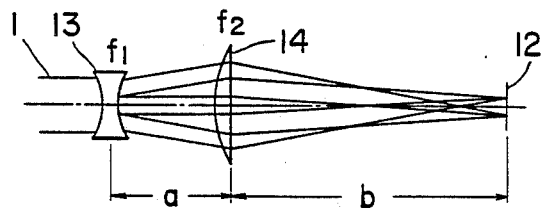
FIG. 3 shows a lens arrangement for explaining the operational principle according to this invention.

Referring to FIG. 1, which shows one embodiment of the mirror arrangement of this invention including a pin-hole plate described in detail hereinafter, laser beam 1 is emitted from a laser oscillator with relatively high output such as a carbon dioxide gas laser oscillator, which is shown by reference letter L. An integration mirror i.e. segmented mirror 2 having a convex mirror surface is arranged obliquely so as to relfect the projected laser beam in other directions as reflected and divided laser beams. The reflection type integration mirror 2 is generally formed by machining a convex surface of a mirror material so as to form a plurality of plane segment mirror elements 3 integrally on the mirror material side by side in a lattice form as shown in FIG. 2. A plurality of laser beams 5 divided and reflected by the plane segment mirrors 3 of the integration mirror 2 are combined into a plurality of condensed beams 6 by a concave mirror 4 arranged so as to reflect the divided laser beams 5 in directions different from those of the beams 5 projected on the concave mirror 4. According to the mirror arrangement described above, the laser beams 5 reflected by the respective plane segment mirrors 3 are focused on one point of the workpiece as a rectangular image. This beam focusing characteristic will be described hereunder in conjunction with FIG. 3 showing one model of an arrangement of a light transmission type optical device. Referring to FIG. 3, a concave transmission type integration lens 13 is arranged instead of the integration mirror 2 shown in FIG. 1 apart from a convex lens 14 by a distance a. A laser beam 1 projected from the lefthand side, as viewed in FIG. 3, of the integration lens 13 passes through the lenses 13 and 14 and is focused on a point or plane 12 of a material to be worked. With this arrangement, assuming that the focal distance of the integration lens 13 is $f_1$, the focal distance of the convex lens 14 is $f_2$ and the distance between the convex lens 14 and the working point 12 is b, the following equation will be established.

$$\frac{1}{a + f_1} + \frac{1}{b} = \frac{1}{f_2} \qquad (1)$$

Accordingly, the distance b is obtained as follows:

$$b = \frac{f_2(a + f_1)}{a + f_1 - f_2} \qquad (2)$$

The size of the focused image on the working point 12 will be expressed by a magnification M as follows:

$$M = \frac{b}{a + f_1} = \frac{f_2}{a + f_1 - f_2} \quad (3)$$

As is understood from the equation (3), the magnification M of the focused image can be changed by changing the distance a between both the lenses 13 and 14 or by changing the focal distance $f_2$ without changing the focal distance $f_1$ of the concave integration lens 13, i.e. integration mirror 2 shown in FIG. 1, thus easily changing the area of the working point 12 as a heat source.

Figure 4:
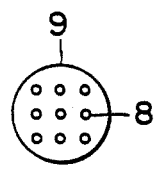
FIG. 4 shows a brief plan view of one example of a plate provided with a plurality of pin holes.

According to the embodiment shown in FIG. 1, the mirror arrangement of this invention is provided with a plurality of focused points of the laser beams 6 reflected by the concave mirror 4 on a plane as designated by reference numeral 7, and accordingly, in a more preferred embodiment, on a plate 9 provided with a plurality of pin-holes 8, such as shown in FIG. 4. The plate 9 is located at the position 7 in FIG. 1, so that the focused points of the laser beams 6 are significantly in accordance with the positions of the pin-holes 8, respectively, in order for the laser beams 6 to pass therethrough. Accordingly, it will be understood that the diameter of each pin-hole 8 and the distance between two adjacent pin-holes 8 can easily be calculated on the basis of the members of the segment mirrors 3 and the radius of curvature of the concave mirror 4. The pin-hole plate 9 is preferably made of a metal having a relatively high heat conductivity such as copper, aluminium or the like and the pin-hole plate 9 is always cooled by cooling means, not shown. The inlet side opening of each pin-hole 8 may be formed to have a bellmouth shape to reduce the inlet side surface area of the pin-hole plate 9 thereby to decreasing the refraction of the laser beams 6 on that surface. Although it is desired that the cross sectional shape of each pin-hole 8 is circular or rectangular, the shape is not necessarily limited to these shapes.

Figure 5:
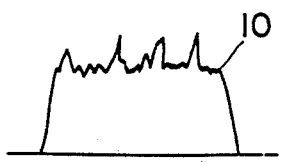
FIGS. 5 and 6 are graphs representing the energy distribution of a laser beam irradiated.
Figure 6:

As described hereinabove, according to the refraction-type mirror arrangement of the optical device, the area to be heated on a material to be worked can be freely changed, and moreover, the location of the pin-hole plate 9 in combination with the mirror arrangement described above extremely improves the even distribution of the laser beam energy. FIGS. 5 and 6 show the energy distribution conditions in the cases where the pin-hole plate 9 is not present (FIG. 5) and is present (FIG. 6).

Figure 7:
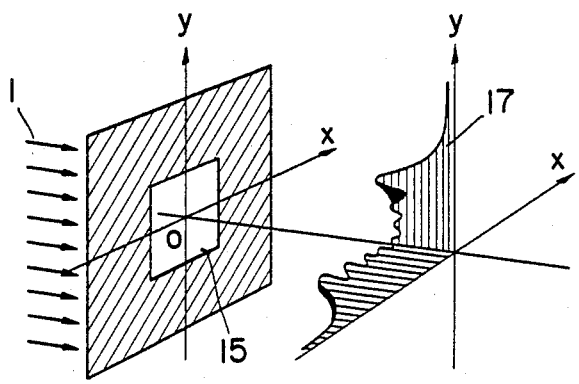
FIG. 7 shows a diffraction pattern of a laser beam passing through a rectangular slit.
Figure 8:
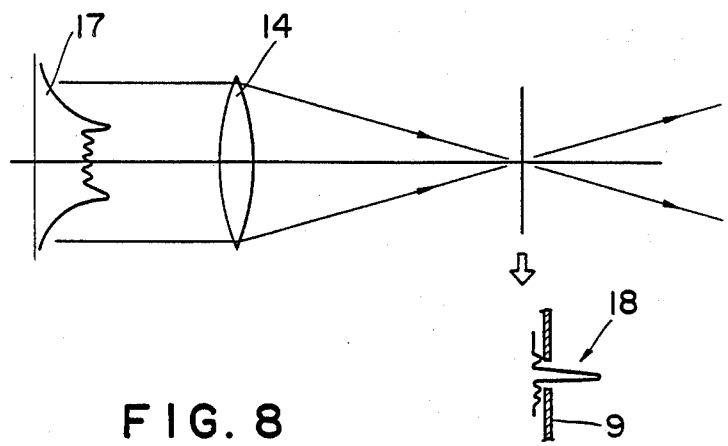
FIG. 8 is a view showing relationship between a pinhole and an intensity distribution of a focused beam based on the pattern shown in FIG. 9.

This energy distribution phenomenon will be understood from the following description with reference to FIGS. 7 and 8. When it is considered that diffraction pattern of the laser beam reflected on one plane surface of one rectangular segment mirror is equivalent to the diffraction pattern 17 of a rectangular opening of a slit 15 as shown in FIG. 7, an intensity distribution of the diffracted image within the Fresnel area exhibits extreme variations as shown. This Fresnel diffraction phenomenon is observed when a concave segmented mirror is used as well as when the convex segmented mirror is used because the laser beams reflected by the respective segment mirrors are finally overlapped on the working point of the workpiece, thus exhibiting the variation of the laser beam energy distribution.

However, the laser beam included in this diffraction pattern is provided with vector components advancing in various directions, and when such laser beam is focused by a lens or a concave mirror, the beam components directed in various directions which are not condensed on the focal point are focused peripherally apart from the focal point as designated by reference numeral 18 in FIG. 8. The location of the pin-hole plate 9 cuts the peripherally focused beam components and only the centrally directed beam components can pass the pin-hole 8, thus obtaining an evenly distributed laser beam having a rectangular shape on a surface of a workpiece to be thermally treated.

Figure 9:
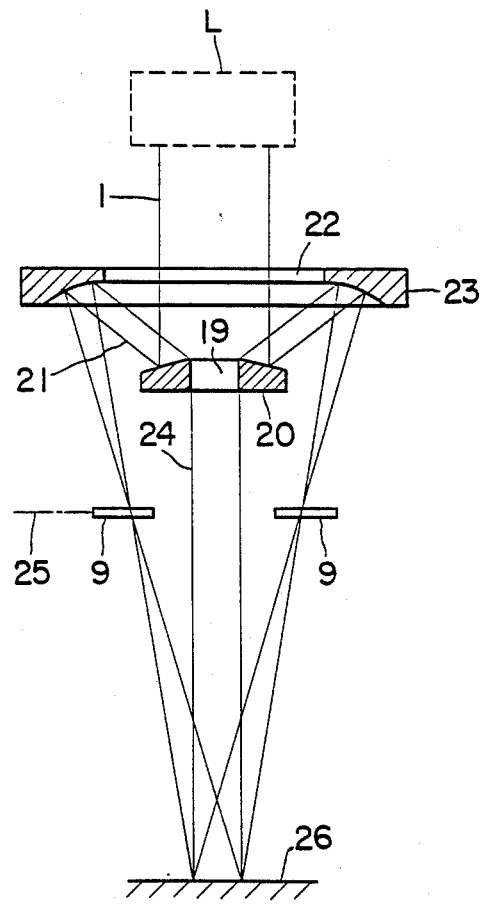
FIG. 9 shows a mirror arrangement of another embodiment according to this invention.

FIG. 9 shows another embodiment of a reflection type optical device according to this invention in which an integration mirror 20, i.e. segmented mirror consisting of a plurality of plane segment mirrors, is arranged to pass the laser beam 1 from a laser oscillator L. The integration mirror 20 is provided with a central through hole 19 having a substantially rectangular shape corresponding to that of one segment mirror of the integration mirror 20 and the through hole 19 is aligned with the axis of the laser beam 1. A concave mirror 23 having a substantially circular configuration is located above the integration mirror 20, as viewed in FIG. 9, at a position in a plane where laser beams 21 reflected and divided by the integration mirror 20 are received so that the concave mirror 23 is provided with a central hole 22 through which the whole laser beam passes. In this embodiment, a plurality of pin-hole plates 9 of substantially the same type as those referred to with the former embodiment are arranged respectively at the focused positions 25 in the paths of the respective reflected and divided beams 21 so as to surround the laser beams 24 passing through the central hole 19 of the integration mirror 20. The location of the pin-hole plates 9 are adjusted by the same manner as that described before with respect to the former embodiment. The concave mirror 23 is preferably provided with such radius of curvature so that each reflected laser beam 21 passing through the pin-hole plate 9 is superimposed on an irradiated point of the laser beam 24 at a surface portion of a work 26 to be worked as a rectangular spot to be heated.

According to this embodiment, since the peripheral portion of the laser beam 1 is inverted and then superimposed on the central portion thereof, the energy of the laser beams is distributed more evenly on the surface of the workpiece to be treated.

In the foregoing embodiments, although an integration mirror is provided with a plurality of plane segment mirrors each having a rectangular shape, plane segment mirrors each having another shape such as a square shape can of course be utilized, and such integration mirror can be prepared by an ordinary machine.

According to the reflection type optical device of the invention, energy of laser beam from a laser beam oscillator can be evenly distributed on a surface of a material to be thermally treated and the surface area to be heated can be freely changed.

What is claimed is:
1. A reflection-type optical device comprising:
    a convex integration mirror comprising a plurality of side-by-side plane segment mirrors on a material having a convex outer configuration so that a laser beam is divided and reflected by said integration mirror as reflected laser beams; and
    a concave mirror arranged to condense said reflected laser beams on a plurality of focal points lying on one plane, said integration mirror and said concave mirror being arranged between a laser beam source and a material to be worked, said concave mirror being further provided with a central hole through which the entire laser beam passes, said integration mirror being further provided with a central hole axially aligned with said hole of the concave mirror to pass a part of the entire laser beam, said integration mirror and said concave mirror being arranged at positions at which laser beams divided and reflected by said integration mirror are received by said concave mirror, the received laser beams being then reflected thereon to superimpose said laser beams reflected by said concave mirror on the laser beam directly passing through said integration mirror on a surface of the material to be worked.

2. The optical device according to claim 1 wherein a plurality of plates provided with pin holes are located at focal points of said laser beams reflected on said concave mirror so that said focal points coincide with locations of said pin-holes, respectively.

3. A reflection-type optical device comprising:

a convex integration mirror with a surface of convex configuration for receiving a laser beam thereon, said integration mirror having on the surface thereof a plurality of plane segment mirrors disposed side by side with a predetermined arrangement for dividing and reflecting the laser beam as divergent laser beams; and a concave mirror having a concave surface disposed to receive and reflect said divergent laser beams and so shaped to condense the reflected divergent beams on a plurality of focal points having said predetermined arrangement, said plurality of focal points lying on a plane extending across the reflected divergent beams and disposed between said concave mirror and a surface to be worked, whereby the reflected divergent beams form clear images of said plane segment mirrors on said surface to be worked.

4. The optical device according to claim 3 wherein each of said segment mirrors has a rectangular shape.

5. The optical device according to claim 3 wherein each of said segment mirrors has a square shape.

6. The optical device according to claim 3, wherein said integration mirror and said concave mirror are arranged between a laser beam source and a material to be worked, said concave mirror further having a central hole through which the entire laser beam passes, said integration mirror further having a central hole axially aligned with said hole of the concave mirror to pass a part of the entire laser beam, and said integration mirror and said concave mirror being arranged at positions at which laser beams, divided and reflected by said integration mirror, are received by said concave mirror, the received laser beams being then reflected thereon to superimpose said laser beams reflected by said concave mirror on the laser beam directly passing through said integration mirror on a surface of the material to be worked.

7. The optical device according to claim 6 wherein a plurality of plates provided with pin-holes are located at focal points of said laser beams reflected on said concave mirror so that said focal points coincide with locations of said pin-holes, respectively.

8. A reflection-type optical device comprising:

a convex integration mirror with a surface of convex configuration for receiving a laser beam thereon, said integration mirror having on the surface thereof a plurality of plane segment mirrors disposed side by side with a predetermined arrangement for dividing and reflecting the laser beam as divergent laser beams;

a concave mirror having a concave surface disposed to receive and reflect said divergent laser beams and so shaped to condense the reflected divergent beams on a plurality of focal points having said predetermined arrangement, said plurality of focal points lying on a plane extending across the reflected divergent beams; and a plate located in said plane and having a plurality of pin-holes positioned respectively at said focal points to allow the reflected divergent beams to pass therethrough.

* * * * *